March 11, 1924.

L. JOUBERT 1,486,763

SUSPENSION DEVICE FOR AUTOMOBILES OR OTHER VEHICLES

Filed Oct. 23, 1922

Inventor
Lucien Joubert

By
Attorney

Patented Mar. 11, 1924.

1,486,763

UNITED STATES PATENT OFFICE.

LUCIEN JOUBERT, OF PARIS, FRANCE.

SUSPENSION DEVICE FOR AUTOMOBILES OR OTHER VEHICLES.

Application filed October 23, 1922. Serial No. 596,533.

*To all whom it may concern:*

Be it known that I, LUCIEN JOUBERT, residing in Paris, France, have invented new and useful Improvements in Suspension Devices for Automobiles or Other Vehicles, of which the following is a specification.

My invention relates to a suspension device which is adapted for use upon automobiles or other vehicles, and it is intended to diminish the resultant force produced by the weight of the non-suspended elements which are secured to the springs and rest directly on the ground; that is, the resultant force produced by the weight of the wheels and the driving and steering axles.

To produce the desired result whereby the reactions due to the road shocks will have less force, thus providing a better spring suspension, a suitable lever is connected by a link with the vehicle frame; one arm of said lever being connected to the axle as hereinafter set forth, and the other arm thereof carrying a counterweight of determined size at the proper distance from the fixed point or fulcrum of the lever.

In this manner it is feasible to entirely neutralize the said resultant force, and, as may be advantageous in some cases, a negative resultant force can even be obtained i. e., it may be caused to act in an upward direction so as to diminish the return movement of the springs after road shocks.

The accompanying drawings which are given by way of example illustrate the said invention.

Figure 1:
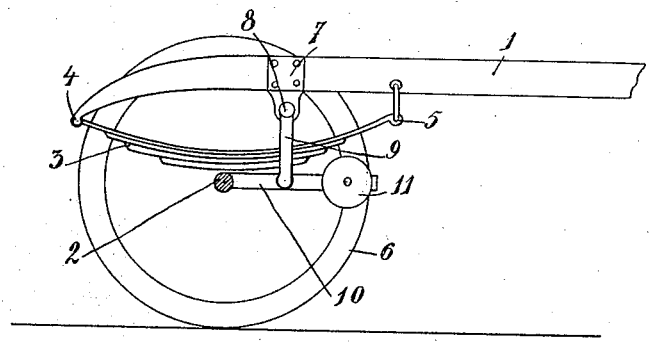
Fig. 1 shows the suspension device as employed upon a vehicle with chain drive and Fig. 2 upon a vehicle with universal joint shaft drive.

The following description sets forth various forms of construction corresponding to the three cases illustrated in the drawings.

The vehicle frame 1 rests in all cases upon the driving axle 2 by means of the plate springs 3, and it is connected to said springs by a fixed coupling 4 and by a shackle 5. The wheels 6 are mounted in the known manner on the ends of the driving axle.

In Fig. 1 are represented the longitudinals of the vehicle frame 1 upon which is secured a plate 7 having at the lower end a lug which is pivoted to a link 9, whose other end is connected with a shock-absorbing lever 10 which is connected by one arm to the axle 2 and by the other arm to the counterweight 11. If the proportion between the arms of said lever and the forces acting on the ends of the same is properly determined a vertical resultant force in an upward direction can be applied at 2.

When the vehicle passes over a road projection the spring becomes compressed and dampens the shock, but during its immediately following reaction, the spring has a tendency to return too quickly and this causes a sudden movement of an objectionable nature. By reason of the said resultant force, however, the spring will return less rapidly, under the influence of its reaction, and the suspension will be thus improved. A similar condition exists when the wheel of a vehicle passes over a hole, in which case the wheel has a tendency, due to its weight and to the compression of the springs, to fall in the said hole, causing a shock, but, according to the present invention, such shock is reduced or eliminated.

In such cases, the greater the resultant force produced by the counterweight, the less rapidly the wheel will fall and the greater the extent to which the ensuing shock will be dampened. If we call F and F′ the forces respectively acting on the ends of the shock absorbing lever, the weight of the counterweight and proportion between the arms of said lever can be determined to obtain either of the three following cases as may be found suitable for each vehicle;

$$F>F' \qquad F=F' \qquad F<F'$$

Figure 2:
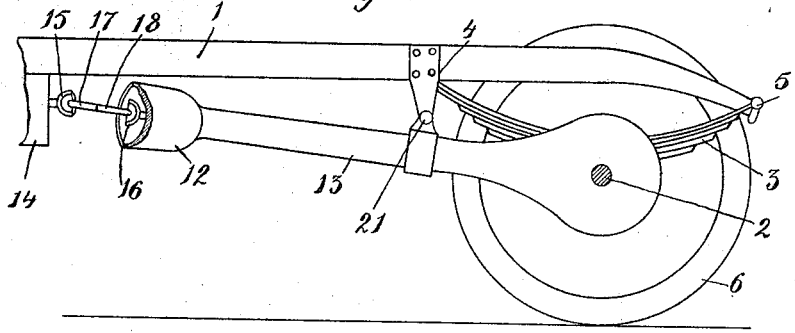

Fig. 2 represents the invention applied to a vehicle having a jointed shaft drive.

In this example, it has been supposed that the thrust is produced by springs, and that the reaction of the torsion couple is counterbalanced by a tube which is connected with the vehicle frame by a ball and socket joint 21 which is brought back to the fixed point of the springs 3, so that the driving axle will describe an arc about this point. But the other end 12 of the tube 13 does the same, and in order to connect it with the change-speed transmission unit 14, it is necessary to dispose between these parts two universal joints 15 and 16 connected together by the pair of telescoping shafts 17 and 18. As in the case of Fig. 1, the resultant force derived from the weight can be utilized to reduce, balance or to produce an upward reaction of the axle, and the effects produced are the same as herein before described.

Figure 3:
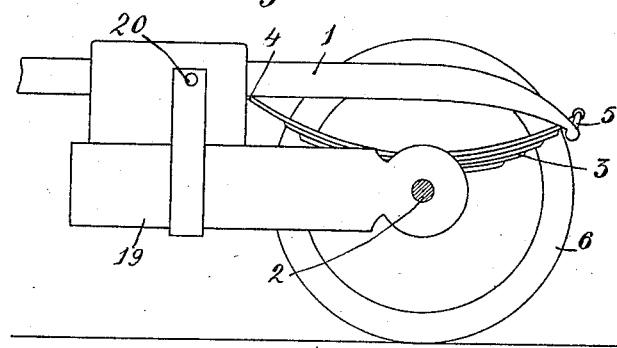
Fig. 3 represents the use of the same with a vehicle having a power unit.

In the case of Fig. 3, the engine, clutch, change-speed transmission unit and driving axle are combined in a power unit 19 which is connected with the vehicle frame by a flexible elastic joint, universal joint shaft, ball-and-socket joint or the like at a point 20, in such manner that the whole shall be partly or totally balanced.

Obviously, the invention can also be employed upon steering wheels, and, moreover, the device is susceptible of numerous modifications based upon the above embodiments which are given solely by way of example. In all such devices the same advantages will be obtained namely:

1. Diminution of the reactions of the suspension; and

2. Improved suspension, resulting in improved riding qualities and greater durability of the vehicles.

I claim:

1. A suspension for automobiles and other vehicles having springs supporting the frame or body upon an axle and road wheels, comprising a member connected at one end to the axle and having a weight-mass acting on its other end, the said member being connected to the vehicle frame and operative under the influence of said weight-mass to dampen the reactions of the springs, axle and wheels.

2. A suspension for automobiles and other vehicles employing springs supporting a frame or body upon an axle and road wheels, comprising a lever having a pivotal connection at a point intermediate its length with the frame, the lever at one side of said pivotal connection being connected to the axle and being connected at the other side of said pivotal connection to a weight-mass, said lever and weight-mass being operative to dampen the reactions of the springs, axle and wheels.

3. A suspension for automobiles employing springs supporting the frame thereof upon an axle and driving means and having a driving shaft cooperative with the axle, comprising a tube surrounding the driving shaft and attached at one end to the axle, the other end of the tube embodying a weight-mass, and a pivotal connection between the intermediate portion of said tube and the frame.

In witness whereof I affix my signature.

LUCIEN JOUBERT.